United States Patent [19]

Ikeda et al.

[11] Patent Number: 5,640,073

[45] Date of Patent: Jun. 17, 1997

[54] BRUSHLESS DC MOTOR UNIT AND METHOD OF DRIVING THE UNIT

[75] Inventors: Hideo Ikeda; Masao Osawa; Masahiro Matsushima, all of Isesaki, Japan

[73] Assignee: Sanden Corp., Isesaki, Japan

[21] Appl. No.: 525,830

[22] Filed: Sep. 8, 1995

[30] Foreign Application Priority Data

Sep. 22, 1994 [JP] Japan ..................... 6-227562

[51] Int. Cl.$^6$ ..................................... H02K 23/00
[52] U.S. Cl. .................. 318/439; 318/254; 388/921; 388/910; 388/915
[58] Field of Search .................. 318/254, 439, 318/138, 139; 388/910, 915, 921, 809–815

[56] References Cited

U.S. PATENT DOCUMENTS

| | | | |
|---|---|---|---|
| 3,670,224 | 6/1972 | Jensen | 318/779 |
| 3,967,173 | 6/1976 | Stitch | 318/811 |
| 4,511,835 | 4/1985 | Studtmann | 318/700 |
| 4,743,815 | 5/1988 | Gee et al. | 318/254 |

Primary Examiner—David S. Martin
Attorney, Agent, or Firm—Kenjiro Hidaka

[57] ABSTRACT

A brushless dc motor unit has 3-phase armature windings, a permanent-magnet rotor, a dc power supply having a motor drive voltage and a midpoint voltage that is one half of the motor drive voltage, and an electronic commutation circuit. Back emf voltages at armature winding terminals are individually delayed by less than 90° and the delayed voltages are individually provided to the positive input terminals of voltage comparators. To the negative input terminals of the comparators is commonly provided a sawtooth-wave comparator reference voltage having a frequency proportional to a current rotor speed and an amplitude whose center voltage is the midpoint voltage. Outputs of the comparators cause a control circuit to transmit signals to control the electronic commutation circuit so as to provide 3-phase dc power to the armature windings. A basic reference voltage regulates the amplitude of the comparator reference voltage, and the value of the basic reference voltage can be changed according to a rotor speed or motor current so as to adjust the delay angle of the comparator outputs. The time constant of the phase delay circuits may be increased when the rotor speed is below a predetermined speed.

9 Claims, 9 Drawing Sheets

"ON" State Timings of Switching Elements

"ON" State Timings of Switching Elements

BRUSHLESS DC MOTOR UNIT AND METHOD OF DRIVING THE UNIT

BACKGROUND OF THE INVENTION

1. Field of the Invention

This invention relates to a small brushless dc motor unit having armature windings supported by a stator, a permanent-magnet rotor and a solid-state switching circuit that electronically commutates dc power to energize the armature windings. The timings for the commutation switchings are determined by the angular position of the rotor that is detected by utilizing the back emf voltages in the armature windings induced by the revolving rotor.

2. Description of the Prior Art

A conventional brushless dc motor unit of this kind will be explained in reference to FIGS. 10 and 11.

Referring to FIG. 10, a conventional brushless motor 101 has Y-connected 3-phase armature windings 102-1, 102-2, 102-3 disposed in a stator (not shown) and a permanent-magnet rotor 103. A dc voltage $V_M$ is provided to a solid-state electronic commutation circuit 105 from a dc power supply 110. The commutated output voltages are individually provided to the armature windings 102-1, 102-2 and 102-3 from 3-phase bridge-connected output terminals 106-1, 106-2 and 106-3, respectively, of the commutation circuit 105 to drive the motor 101. The commutation circuit 105 consists of six solid-state switching elements (or, transistors) 107-1, 107-2, 107-3, 107-4, 107-5 and 107-6, having respective control terminals that are individually connected to six switching control outputs of a control unit 108.

The switching elements 107-1~6 are turned on and off by switching control signals transmitted from the control unit 108 at specific rotor angles. The switching sequence is arranged to cause the armature windings to produce a rotating magnetic flux in the air gap that interacts with the flux produced by permanent magnets on the rotor 103 so as to rotate the rotor in synchronism with the rotating magnetic field.

The induced terminal voltages of the 3-phase armature windings 102-1, 102-2 and 102-3 are provided to 90° phase delay filter circuits 111-1, 111-2 and 111-3, respectively, so that the phase angle of each voltage is delayed by 90° thereby. The reason for the delay angle being 90° for the conventional brushless dc motor will be discussed later. The phase delay filter circuits 111-1, 111-2 and 111-3 consist of resistors R14, R15 and R16, respectively, connected in series to the respective armature winding terminals, and capacitors C6, C7 and C8, respectively, connected in parallel as shown. The 90° phase-delayed output voltages Fu, Fv and Fw, of the filter circuits 111-1, 111-2 and 111-3, respectively, are provided to the positive input terminals of voltage comparators 112-1, 112-2 and 112-3, respectively. To the negative input terminals of the voltage comparators 112-1~3 is commonly provided a midpoint voltage $V_N$. The midpoint voltage $V_N$ is obtained by summing the phase-delayed voltages Fu, Fv and Fw through resistors R17, R18 and R19, respectively.

FIG. 11 is a waveform chart for explaining the function of the control circuits of the conventional brushless dc motor unit shown in FIG. 10. FIG. 11(A) shows a waveform of the terminal voltage Vu of the winding 102-1. FIG. 11(B) shows a waveform of the 90° phase-delayed output voltage Fu of the phase delay filter circuit 111-1 and the midpoint voltage $V_N$. FIG. 11(C) shows a waveform of an output voltage Cu of the voltage comparator 112-1. FIG. 11(D) shows "ON" state timings of the six solid-state switching elements 107-1($U^+$), 107-2($V^+$), 107-3($W^+$), 107-4($U^-$), 107-5($V^-$) and 107-6($W^-$).

The terminal voltage Vu is a trapezoidal wave that has spike voltages Vsp at the ends of the "ON" states of the corresponding switching elements 107-1($U^+$) and 107-4($U^-$), as shown in FIG. 11(A) along with FIG. 11(D). The other terminal voltages Vv, Vw have a like waveform and spikes, though there exists a 120° phase shifting one another among the three-phase terminal voltages Vu, Vv and Vw.

The spike voltages Vsp appear when the currents to the windings 102-1, 102-2 and 102-3 are interrupted by the commutation circuit 105. The phase-delayed output voltages Fu, Fv and Fw of the filter circuits 111-1, 111-2 and 111-3, respectively, are compared to the midpoint voltage $V_N$ by the voltage comparators 112-1, 112-2 and 112-3, respectively, which output voltages Cu, Cv and Cw, respectively. The output voltage Cu has a rectangular waveform that rises or falls at the moments the voltage Fu becomes even with the midpoint voltage $V_N$, as shown in FIG. 11(C) along with FIG. 11(B). The other output voltages Cv, Cw have a like waveform, but with shifted phase angles.

At the rising edge 115 of the output voltage Cu, a control unit 108 generates control signals that are individually provided to the control terminals of the switching elements 107-5 and 107-6 so that the control signals cause the switching element 107-5($V^-$) to be turned off and the switching element 107-6($W^-$) to be turned on, as shown in FIG. 11(D) along with FIG. 11(C). On the other hand, at the falling edge 116 of the output voltage Cu, the control unit 108 generates control signals that are individually provided to the control terminals of the switching elements 107-2 and 107-3 so that the control signals cause the switching element 107-2($V^+$) to be turned off and the switching element 107-3($W^+$) to be turned on. In other words, the turn-on timings for the W-phase switching elements and turn-off timings of the V-phase switching elements are derived from the terminal voltage of the U-phase winding 102-1.

Control signals are also similarly generated in the control unit 108 in reference to the output voltages Cv (V-phase) and Cw (W-phase) and individually provided to the corresponding switching elements. In this manner, the armature windings 102-1, 102-2 and 102-3 are provided with 3-phase dc voltages through the commutation circuit 105, so that the motor is driven.

Problems Pertaining to the Conventional Motor

In the conventional brushless motor as described above, since the delay angle of the phase delay filter circuits is 90°, the control system can not respond to a sudden load variation of the motor quickly enough, and this will cause, in the worst case, the rotor to trip off or stall. Furthermore, when an attempt is made to operate the motor at as low speed as possible, the time constant of the phase delay filter circuits has to be increased. However, if the time constant is increased, the amplitudes of the outputs Fu, Fv and Fw of the phase delay filter circuits will become smaller, then the control circuit tends to be affected by the offsets of the voltage comparators, and the control circuit will become more susceptible to electrical noises. In addition, increased time constant of the phase delay filter circuits necessitates use of large capacitors, which will prevent the motor unit from being made compact. Furthermore, in starting of a brushless dc motor, the rotor is started and accelerated by a synchronous starting means to a rotor speed that is fast enough to produce a back emf so that the rotor position detection is possible. However, if the time constant of the phase delay filter circuits is large, the starting rise time is liable to increase, or even the starting may sometimes become impossible.

SUMMARY OF THE INVENTION

It is therefore an object of the present invention to provide a small brushless dc motor unit without having problems coherent to such conventional 90° phase delay circuits as described above, yet having a good response to a sudden load variation and a stable rotor position detection even in a low speed range and, further still, having a control circuit being less susceptible to electrical noises.

In order to achieve the above object, a brushless motor unit according to the present invention has a dc power supply, 3-phase armature windings supported by a stator, a permanent-magnet rotor actuated by rotating magnetic flux generated by the armature windings being energized, an electronic commutation circuit (or, also called electronic inverter) consisting of a plurality of 3-phase bridge connected solid-state switching elements (or, transistors) for selectively providing dc power from the dc power supply to the 3-phase armature windings, a plurality of phase delay filter circuits for individually delaying the phase angles of the back emf voltages taken from the 3-phase armature winding terminals by an angle of less than 90°, a plurality of voltage comparators whose positive input terminals are individually connected to the respective output terminals of the phase delay circuits, a comparator reference voltage computation circuit that outputs a sawtooth-wave comparator reference voltage having a frequency proportional to a current rotor speed and an amplitude, which is regulated by a basic reference voltage, with the midpoint voltage as the center voltage thereof. The sawtooth-wave comparator reference voltage is commonly provided to the negative input terminals of the comparators so that the respective phase-delayed voltages are compared thereto. A control unit receives output voltages of the comparators and, in reference individually thereto, transmits switching control signals to the switching elements so as to control the commutation circuit. The switching control signals perform a commutating function similar to that of the conventional motor unit that employs 90° phase delay filter circuits as discussed above.

BRIEF DESCRIPTION OF THE DRAWINGS

FIG. 4(A) shows six sequential timing steps (1)~(6) per winding energizing cycle period, FIG. 4(B) shows a waveform of an armature winding terminal voltage, FIG. 4(C) shows waveforms of an output voltage of a phase delay filter circuit and an output voltage of the comparator reference voltage computation circuit, FIG. 4(D) shows a waveform of an output voltage of a voltage comparator, and FIG. 4(E) shows "ON" state timings of six solid-state switching elements;

DETAILED DESCRIPTION OF THE PREFERRED EMBODIMENTS

The present invention will now be described in detail with reference to the drawings.

Figure 1:
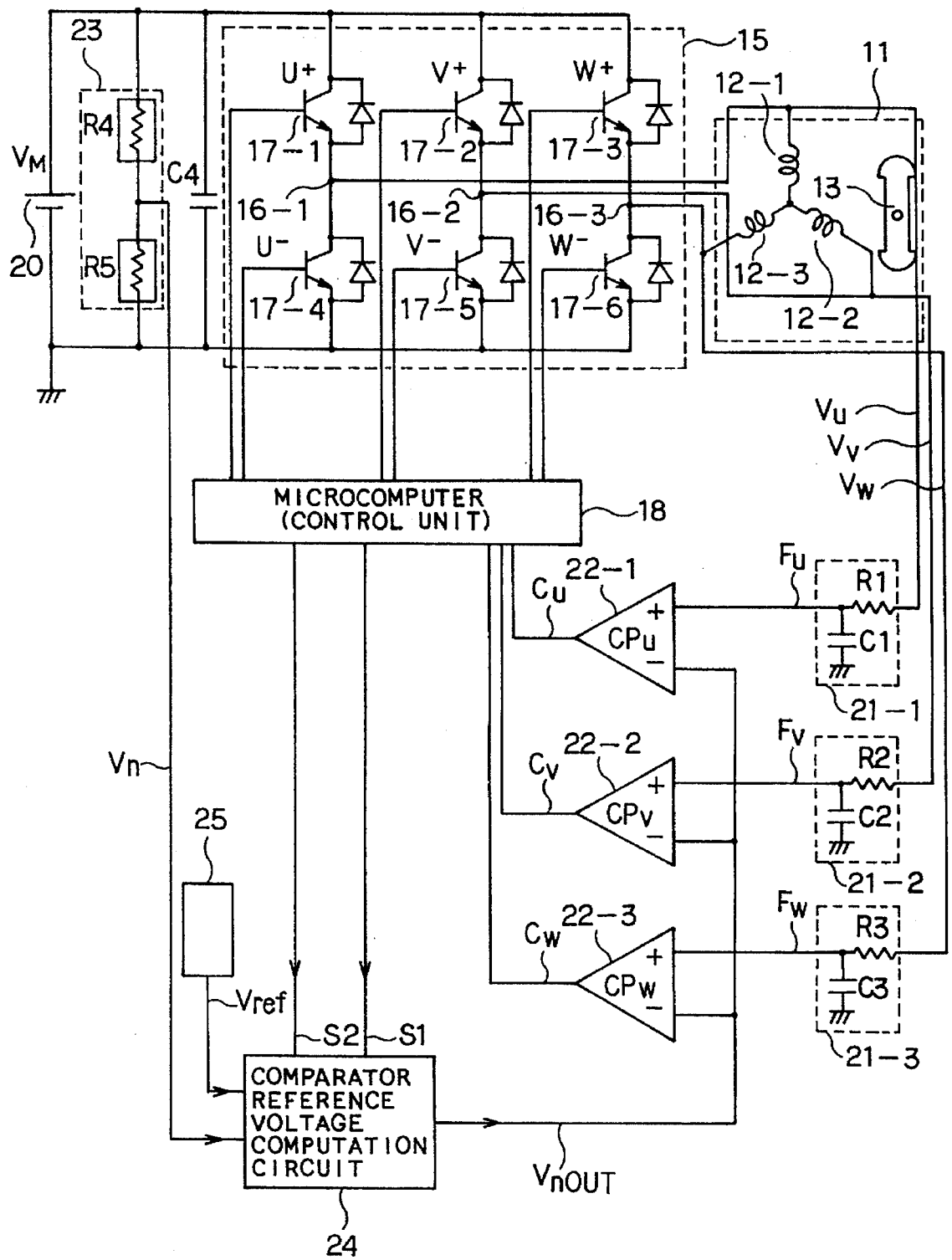
FIG. 1 is a circuit diagram of a brushless dc motor unit according to the first and basic embodiment of the present invention.

FIG. 1 is a circuit diagram of a brushless dc motor unit according to the first and basic embodiment of the present invention. A brushless dc motor 11 primarily consists of Y-connected 3-phase armature windings 12-1, 12-2, 12-3 supported by a stator (not shown) and a permanent-magnet rotor 13. An electronic commutation circuit (or, also called electronic inverter) 15 has three pairs of bridge-connected solid-state switching elements (or, transistors) 17-1,4 (U-phase), 17-2,5 (V-phase) and 17-3,6 (W-phase), each switching element having a control terminal that is individually connected to each of six control outputs of a microcomputer (i.e. control unit) 18. The three pairs of the switching elements 17-1~6 have respective output terminals 16-1, 16-2 and 16-3 that are connected to the terminals of the armature windings 12-1, 12-2, 12-3, respectively. A dc voltage VM of a dc power supply 20, with a grounded negative terminal, is applied to each of the three pairs of the switching elements as shown.

The terminal voltages Vu, Vv and Vw, which are back emf voltages induced by the rotor in rotation, of the 3-phase armature windings 12-1, 12-2 and 12-3, respectively, are provided to phase delay filter circuits 21-1, 21-2 and 21-3, respectively, and phase angle in each circuit is delayed thereby by an electrical angle of approximately 60° in this particular embodiment. But it is also permissible if the delay angle is less than 90° but more than 30°. The phase delay filter circuits 21-1, 21-2 and 21-3 consist of resistors R1, R2 and R3, respectively, connected in series to the terminals of the armature windings 12-1, 12-2 and 12-3, respectively, and capacitors C1, C2 and C3, respectively, connected in parallel between the outputs of the respective resistors and ground. The phase-delayed output voltages Fu, Fv and Fw from the phase delay filter circuits 21-1, 21-2 and 21-3, respectively, are provided to the positive input terminals of voltage comparators 22-1, 22-2 and 22-3, respectively.

The voltage VM across the dc power supply 20 is divided in half by a voltage divider 23, which consists of a pair of resistors R4 and R5, so as to produce a midpoint voltage Vn. The midpoint voltage Vn is provided to a comparator reference voltage computation circuit 24. The comparator reference voltage computation circuit 24 performs an arithmetic-logic operation in reference to the midpoint voltage Vn, as will be described in detail later, so as to output a sawtooth-wave comparator reference voltage VnOUT that is commonly provided to all of the negative input terminals of the voltage comparators 22-1, 22-2 and 22-3. In addition to the midpoint voltage Vn, to the comparator reference voltage computation circuit 24 are individually provided with a predetermined basic reference voltage Vref from a basic reference voltage generator 25 and a pair of switch on-off signals S1 and S2 from the microcomputer 18.

Figure 2:
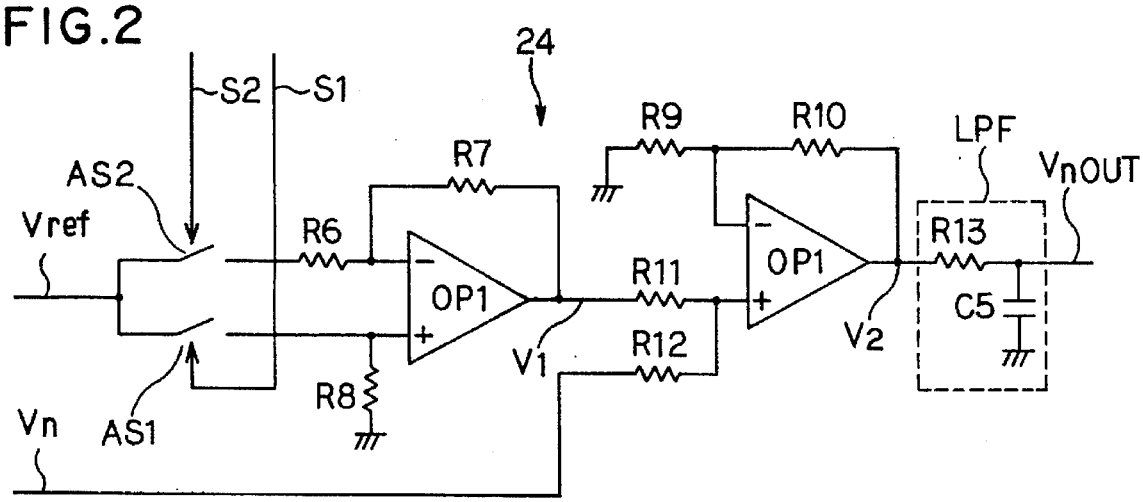
FIG. 2 is a detailed schematic diagram of a comparator reference voltage computation circuit that is shown in FIG. 1 in a block form.

FIG. 2 is a detailed schematic diagram of the comparator reference voltage computation circuit 24. The basic reference voltage Vref is commonly provided to a pair of analogue on-off switches AS1 and AS2 connected in parallel. The switches AS1 and AS2 are alternately turned on and off at a frequency proportional to a current rotor speed by a pair of switch on-off signals S1 and S2, respectively, transmitted from the microcomputer 18 (FIG. 1), so that the outputs of the switches AS1 and AS2 are alternately nil or the basic reference voltage Vref itself. The output of the switch AS1 is provided to the positive (non-inverting) input terminal of a first operation amplifier OP1 and the output of the switch AS2 is provided to the negative (inverting) input terminal of the first operation amplifier OP1.

Three resistors R6, R7 and R8, each having an identical resistance value, are connected to the first operation amplifier OP1 as shown. Since the resistance value of the resistors R6, R7 and R8 are all the same, when the switch AS1 is "ON" (the switch AS2 is "OFF") the first operation amplifier OP1 will function as a non-inverting amplifier having an amplification factor 1, whereby an output voltage V1 thereof will be the basic reference voltage Vref itself. Conversely, when the switch AS2 is "ON" (the switch AS1 is "OFF") the first operation amplifier OP1 will function as an inverting amplifier having an amplification factor 1, whereby the output voltage V1 thereof will be an inverted basic reference voltage, i.e. –Vref.

The output voltage V1 of the first operation amplifier OP1 and the midpoint voltage Vn are provided to the positive input terminal of a second operation amplifier OP2. Four resistors R9, R10, R11 and R12, each having an identical resistance value, are connected to the second operation amplifier OP2 as shown. Since the resistance values of the resistors R9, R10, R11 and R12 are all the same, the second operation amplifier OP2 functions as a voltage summing amplifier with the voltages V1 and Vn being the input voltages to be summed up. An output voltage V2 of the second operation amplifier OP2 is provided to a low-pass filter LPF, which consists of a resistor R13 and a capacitor C5, so that the above mentioned sawtooth-wave comparator reference voltage VnOUT is outputted therefrom.

Figure 3:
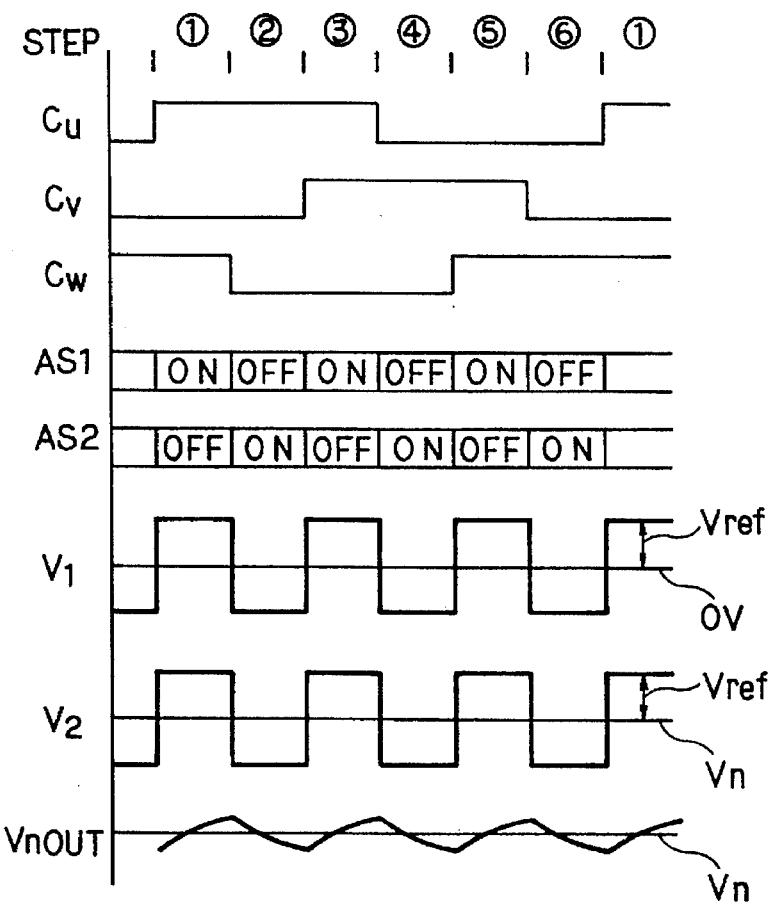
FIG. 3 is a waveform diagram that will help explain the function of the comparator reference voltage computation circuit shown in FIG. 2.

FIG. 3 is a waveform diagram that will help explain the function of the comparator reference voltage computation circuit 24 of FIG. 2. The six serial steps (1)~(6), denoted by the word "STEP", constitute one electrical cycle period (i.e. 360° electrical angle) that corresponds to one winding energizing cycle period and one revolution of the magnetic flux generated by the 3-phase windings being energized. The rotor 13 keeps rotation synchronously with the revolving magnetic flux as the 6-step cycle is repeated. In this case, the sawtooth-wave comparator reference voltage VnOUT has a cycle period that equals to one third of the cycle period (i.e. three times in frequency) of the terminal voltages Vu, Vv and Vw of the armature windings 12-1, 12-2 and 12-3, respectively, or the cycle period for energizing the 3-phase armature windings.

In FIG. 3, "Cu", "Cv" and "Cw" represent the waveforms of the output voltages of the voltage comparators 22-1, 22-2 and 22-3, respectively, shown in FIG. 1. The cycle period, or the frequency, of the output voltages Cu, Cv and Cw is identical to that of the winding terminal voltages Vu, Vv and Vw. The switchings from one step to the succeeding step for the steps (1)~(6) are performed by the microcomputer 18 in reference to the waveforms Cu, Cv and Cw with a frequency proportional to the rotor speed. "AS1" and "AS2" represent the timings of the ON/OFF states of the switches AS1 and AS2, respectively, that alternately occur in synchronism with the steps (1)~(6). "V1" represents a waveform of the output voltage V1 of the first operation amplifier OP1, which is a rectangular waveform having a 2-times Vref amplitude with a center voltage grounded and a cycle period being equal to a 2-step time period. "V2" represents a waveform of the output voltage V2 of the second operation amplifier OP2, which has the same waveform, the same amplitude and the same cycle period as those of the output voltage V1, but a center voltage of the amplitude being Vn. In other words, the voltage V2 is a voltage of V1 shifted up by Vn. "VnOUT" represents a sawtooth waveform of the comparator reference voltage VnOUT having the same center voltage (Vn) and the same cycle period as those of the voltage V2.

Figure 4:
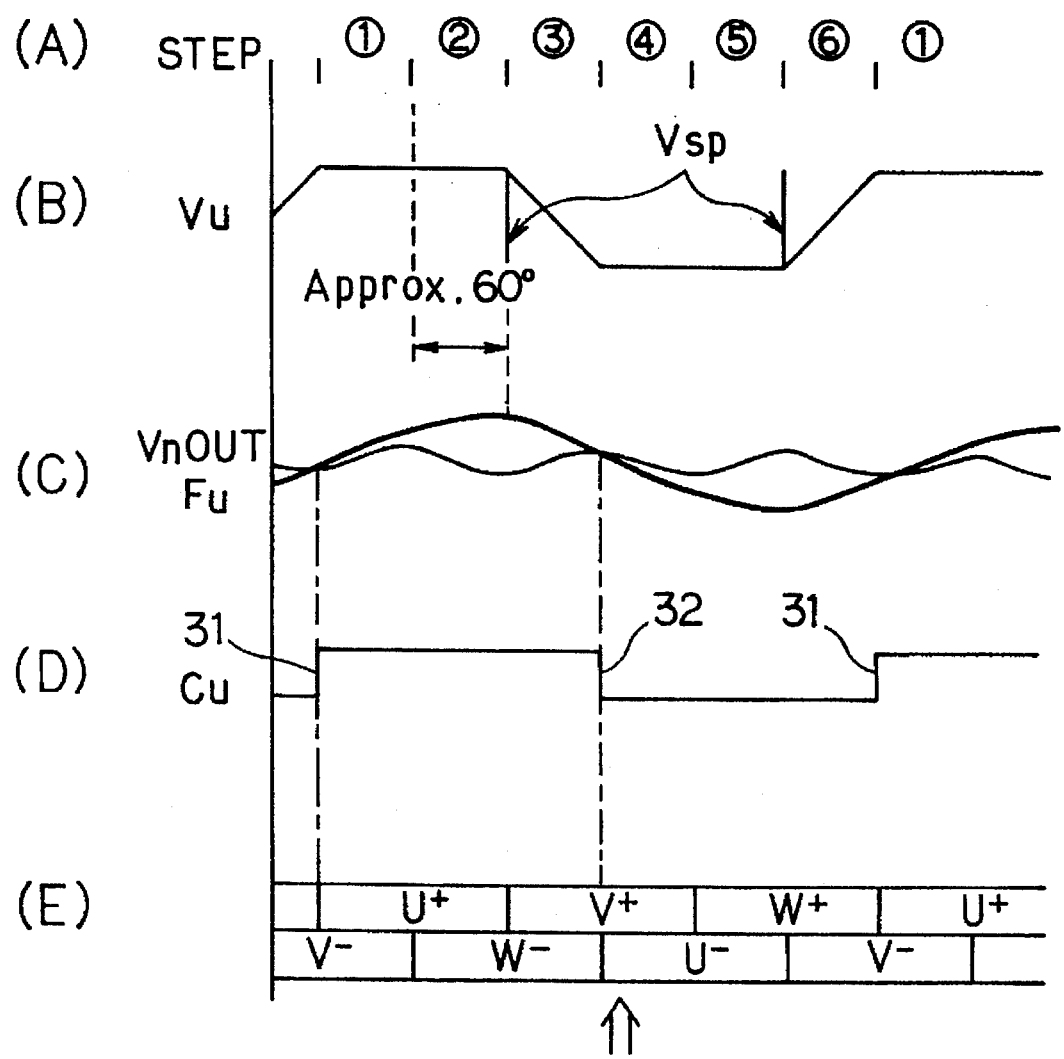
FIG. 4 shows voltage waveforms at various points of the circuitry shown in FIG. 1, more specifically.

FIG. 4 shows voltage waveforms at parts of the circuitry shown in FIG. 1 to help explain the function of the motor unit of the present invention. More specifically, FIG. 4(A) shows six timing steps (1), (2), (3), (4), (5) and (6), each step corresponding to a 60° electrical angle and the complete 6-step period corresponds to one energizing cycle for the 3-phase armature windings; FIG. 4(B) shows a waveform of the terminal voltage Vu of the winding 12-1; FIG. 4(C) shows waveforms of the phase-delayed output voltage Fu of the phase delay filter circuit 21-1 and the comparator reference voltage VnOUT outputted from the comparator reference voltage computation circuit 24; FIG. 4(D) shows a waveform of the output voltage Cu of the voltage comparator 22-1; and FIG. 4(E) shows "ON" state timings of the six solid-state switching elements 17-1($U^+$), 17-2($V^+$), 17-3($W^+$), 17-4($U^-$), 17-5($V^-$) and 17-6($W^-$).

The output voltages Fu, Fv and Fw of the phase delay filter circuits 21-1, 21-2 and 21-3, respectively, are delayed by approximately 60° with respect to the phase angles of the winding terminal voltages Vu, Vv and Vw, respectively. As shown in FIG. 4(B), the winding terminal voltage Vu is of a trapezoidal waveform having spikes of a voltage Vsp at the ends of steps (2) and (5). Such spikes appear in the terminal voltages Vu, Vv and Vw when the corresponding switching elements are turned off, or, in other words, the currents to the respective armature windings 12-1, 12-2 and 12-3 are interrupted by the commutation circuit 15. The phase-delayed output voltage Fu, as shown in FIG. 4(C) of the phase delay filter circuit 21-1 is compared with the comparator reference voltage VnOUT outputted from the comparator reference voltage computation circuit 24 by the voltage comparator 22-1, and the voltage Cu as shown in FIG. 4(D) is outputted from the voltage comparator 22-1. The output voltage Cu has a rectangular waveform that rises or falls as the voltage Fu and the voltage VnOUT come even with each other, as shown in FIG. 4(D) along with FIG. 4(C).

Reference is now made to FIG. 3 along with FIG. 4. Immediately before the voltage Cu rises at the end of step (6), as indicated by reference numeral 31, the voltages Cu and Cv are at level "0" and the voltage Cw is at level "1", and the switching elements 17-3($W^+$) and 17-5($V^-$) are in "ON" state. As the rotor 13 maintains rotation, and when the voltage Cu turns from level "0" to level "1", step 6 is switched over to step 1. The microcomputer 18 receives this switching information and, simultaneously, the microcomputer 18 transmits switching control signals individually to the switching elements 17-3(W⁺) and 17-3(U⁺) so as to cause the switching element 17-3(W⁺) to be turned "OFF" and 17-3(U⁺) to be turned "ON", as will be understood in reference to FIG. 4(E). Simultaneously, the microcomputer 18 causes the analogue switch AS1 to be turned "ON" and the switch AS2 to be turned "OFF", as shown in FIG. 3. Then, at this time, the output voltage $V_{nOUT}$ of the comparator reference voltage computation circuit 24 starts to increase, as seen in FIG. 4(C). Likewise, when the voltage Cu falls at the end of step (3), as indicated by reference numeral 32, the microcomputer 18 transmits switching control signals individually to the switching elements 17-6 (W⁻) and 17-4(U⁻) so as to cause the switching element 17-6(W⁻) to be turned "OFF" and 17-4(U⁻) to be turned "ON", as will be understood in reference to FIG. 4(E).

As described above, the switching control signals provided from the microcomputer 18 to the phase "U" switching elements, for example, to start energizing the phase "U" armature winding 12-1 are obtained from the voltage Cu that is derived from the terminal voltage Vu of the phase "U" armature winding 12-1. Similarly, other switching control signals are produced in the microcomputer 18 responsive to the respective output voltages Cv (phase "V") and Cw (phase "W"), which are derived from the armature winding terminal voltages Vv and Vw, respectively, and transmitted to the control terminals of the corresponding switching elements. Thus, to the armature windings 12-1, 12-2 and 12-3 are provided with 3-phase dc voltages, with a shifted phase angle of 120° one another, from the dc power supply 20 by way of the electronic commutation circuit 15, and a revolving magnetic flux generated by the 3-phase windings being energized causes the permanent-magnet rotor 13 to be kept rotated.

In the present invention, since the phase delay filter circuits 21-1, 21-2 and 21-3 are purposely selected for the phase delay angle of less than 90°, i.e. approximately 60°, the control circuit can respond to a sudden load variation to the motor quickly enough and, therefore, a danger of rotor trip-off can be obviated. Furthermore, by the use of such phase delay filter circuits the amplitudes of the output voltages Fu, Fv and Fw thereof are large enough to enable stable and reliable rotor position detection even in a low rotor speed range. This also makes the motor control less susceptible to electrical noises. Furthermore, since the amount of time constant of the phase delay filter circuits of the present invention is small as compared to that of the 90° delay circuits of the conventional motor, the capacitors C1, C2 and C3 can be small, whereby entire size of the motor unit can be minimized. In addition, since the motor position detection can be made reliably even in a low speed range, quick and problem-free rotor starting and acceleration can be realized by a synchronous starting method.

Figure 5:
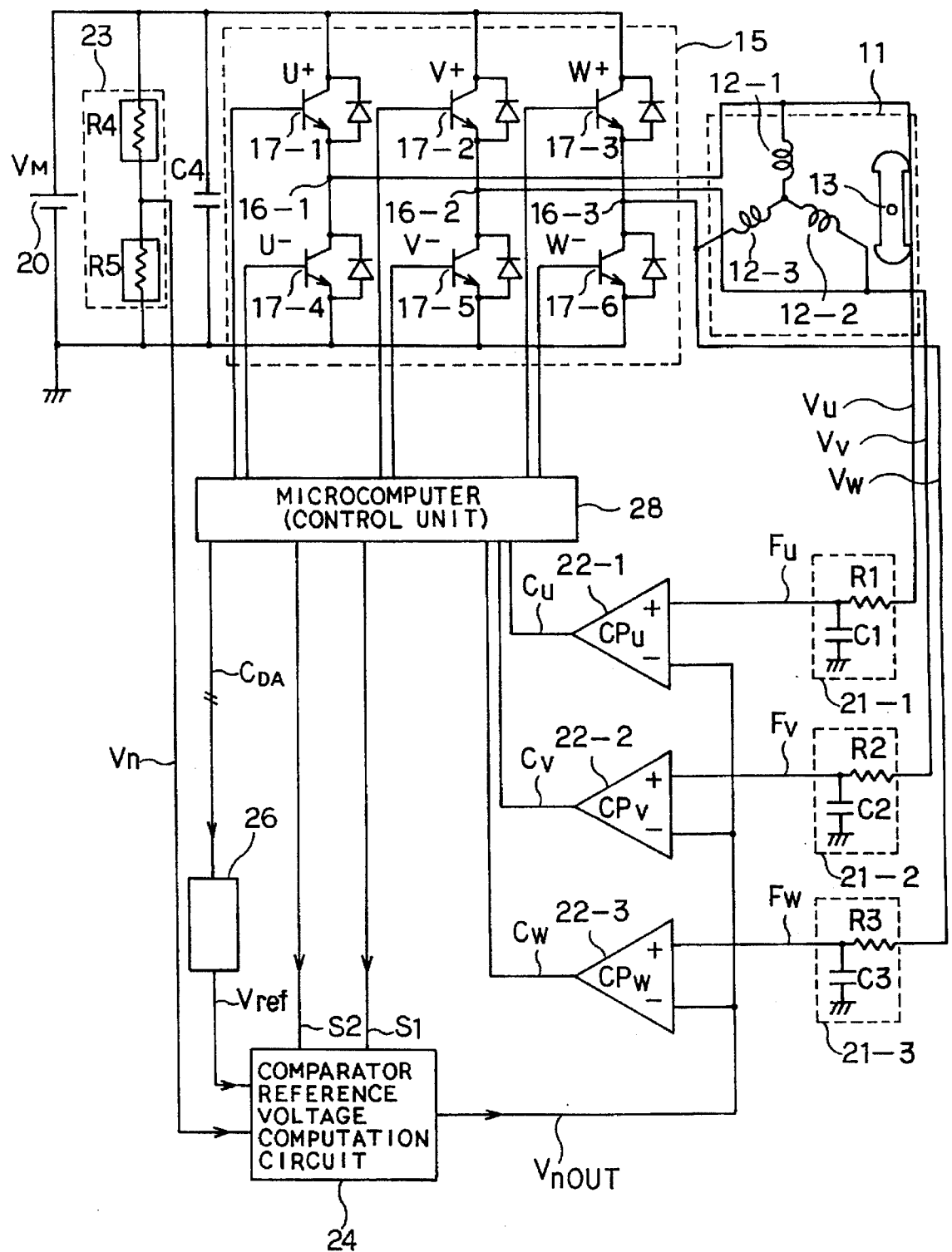
FIG. 5 is a circuit diagram of a brushless dc motor unit according to the second embodiment of the present invention.

FIG. 5 is a circuit diagram of a brushless dc motor according to the second embodiment of the present invention. Most components and functions of the second embodiment are identical to those of the first embodiment shown in FIG. 1. Like reference characters in FIGS. 5 and 1 denote like components having like functions. Therefore, only the parts of the second embodiment (FIG. 5) in which the second embodiment is different from the first embodiment (FIG. 1) will be explained below.

Referring to FIG. 5, a microcomputer 28 detects a rotational speed of the rotor 13 from the frequency of the output Cu, Cv or Cw of the voltage comparators 22-1, 22-2 or 22-3, respectively. Then, the microcomputer 28, according to the rotational speed of the rotor 13, transmits a basic reference voltage setting signal $C_{DA}$, tO a DA converter 26 so that the DA converter generates an adjusted and optimum basic reference voltage Vref that varies depending on the rotor speed. The basic reference voltage setting signal $C_{DA}$ transmitted to the DA converter 26 causes the basic reference voltage Vref to be large when the rotor speed is large, and the basic reference voltage Vref to be small when the rotor speed is small. The increase or decrease of the basic reference voltage Vref causes the amplitude of the sawtooth-wave output voltage $V_{nOUT}$ of the comparator reference voltage computation circuit 24 to be increased or decreased, respectively.

Figure 6:
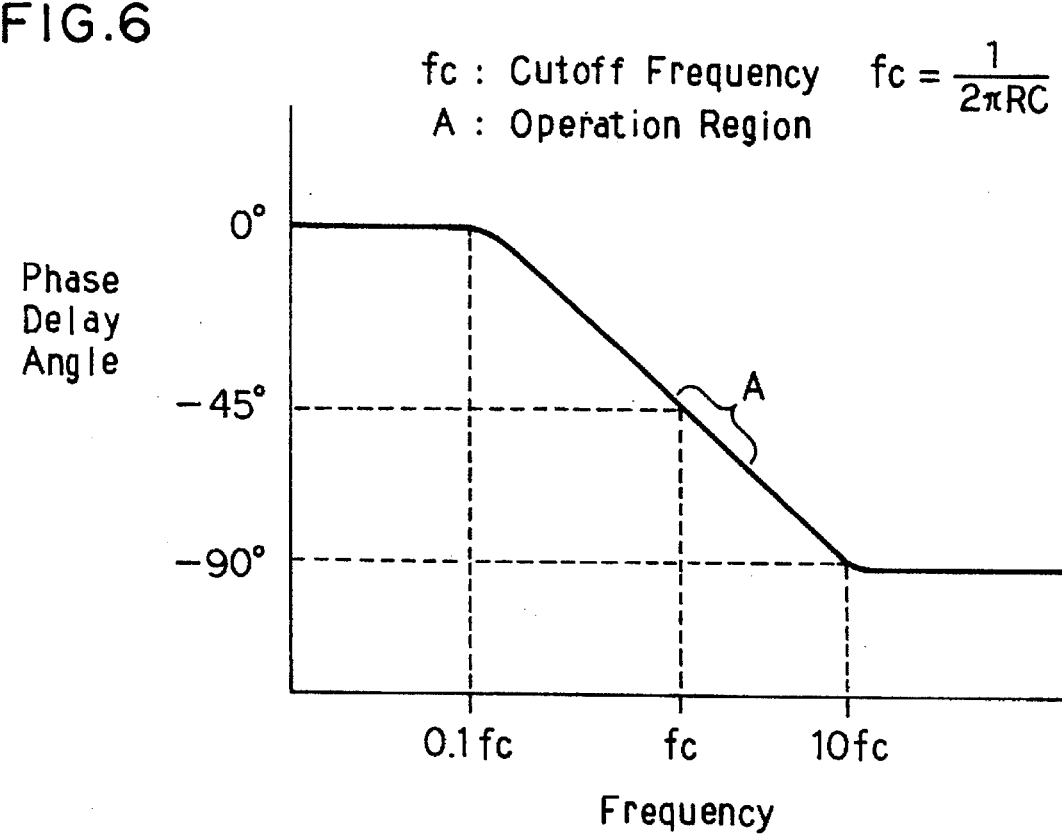
FIG. 6 is a graph showing phase delay angle vs. frequency characteristics of the phase delay filter circuits.

FIG. 6 is a graph showing phase delay angle vs. frequency characteristics of phase delay filter circuits. This graph is intended to explain on the added and improved function of the present invention. In the graph, "fc" represents the cutoff frequency of the phase delay circuits. (Namely, fc=½πRC) As shown in FIG. 6, the delay angle varies as the frequency varies within a limited frequency range. There is no delay in the frequency range from 0 to 0.1 fc. The delay angle increases from 0° to 90° as the frequency increases from 0.1 fc to 10 fc, but the delay angle remains constant at 90° if the frequency exceeds 10 fc.

The phase delay filter circuits 111-1, 111-2 and 111-3 of the conventional brushless dc motor unit, as discussed above in reference to FIG. 10, are intended to be used in a frequency range of the saturation region, where the delay angle is 90° constant. The main reason for that is once the R and C values of the phase delay filter circuits are determined so that the frequency range of the induced winding terminal voltages, which represents the rotor speed range, comes within the saturated region (over 10 fc in FIG. 5), the delay angle can be maintained at 90° constant as long as the rotor speed stays within the intended range, and this leads to a simple circuit structure. However, once the rotor speed (i.e. frequency) is out of the intended operational range and comes down into the non-saturation region, the delay angle becomes smaller than 90°, thereby causing the switching timings to be excessively advanced and the motor control difficult.

Whereas, in the present invention, since the phase delay filter circuits 21-1, 21-2 and 21-3 are purposely operated with a delay angle smaller than 90°, such as 60°, the operating region, indicated by letter "A" in FIG. 6, is in the linear region (non-saturation region). Therefore, within this operating region, the amount of the delay varies depending on the frequency of the output voltages of the phase delay filter circuits 21-1~3 or of the terminal voltages Vu, Vv and Vw of the armature windings 12-1, 12-2 and 12-3, respectively.

Namely, as the rotor speed increases, the delay angle of the outputs Fu, Fv and Fw of the phase delay filter circuits 21-1, 21-2 and 21-3, respectively, also increases. This added phase angle delay causes the turn-on timings of the switching elements of the commutation circuit 15 to be also delayed with respect to the current angular position of the rotor 13. Therefore, when the rotor speed exceeds a certain speed, the amount of the phase delay may become excessive and the rotor 13 may consequently trip off. Oppositely, when the motor speed is too slow, the amount of the phase delay of the outputs Fu, Fv and Fw may become too small, causing the switching timings to be unwantedly advanced, and the rotor may likewise trip off. It can be said in this case that the speed range in which the rotor can be run safely and reliably will have to be limited. The second embodiment of the present invention is intended to solve such a problem.

In the second embodiment, as shown in FIG. 5, the basic reference voltage Vref is made to be increased when the rotor speed is large, and decreased when the rotor speed is small, by the microcomputer 28 and the DA converter 26. The increase or decrease of the basic reference voltage Vref causes the amplitude of the comparator reference voltage VnOUT outputted from the comparator reference voltage computation circuit 24 to be increased or decreased, respectively.

Figure 7:
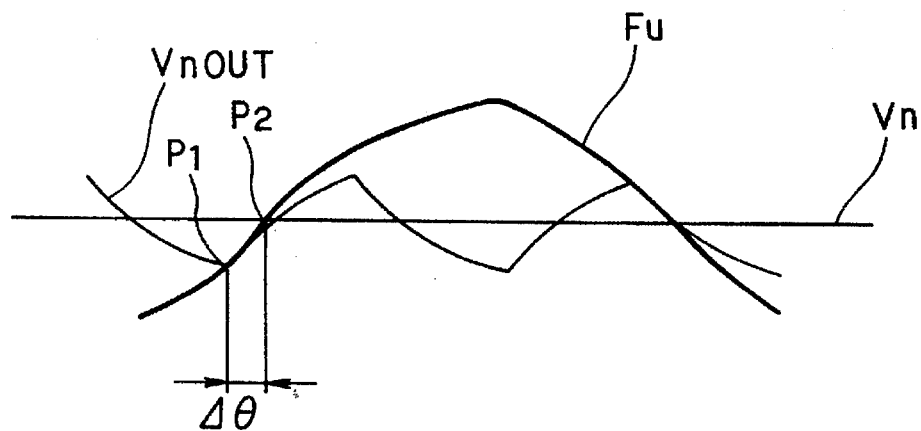
FIG. 7 is a graph showing the correlation between the output voltage of the phase delay filter circuit and the output voltage of the comparator reference voltage computation circuit.

FIG. 7 is a graph showing the correlation between the variation of the amplitude of the comparator reference voltage VnOUT and the shifting of electrical angle where the comparator reference voltage VnOUT becomes even with the output voltage Fu. In reference back to FIGS. 2 an 3, when the basic reference voltage Vref inputted to the comparator reference voltage computation circuit 24 is increased, the output voltages V1 and V2 of the operation amplifiers OP1 and OP2, respectively, are also increased, and, consequently, the amplitude of the filtered sawtooth-wave output voltage, i.e. the comparator reference voltage VnOUT is increased as well. In FIG. 7, "$\Delta\theta$" represents the electrical angle difference between the cross point P1 of the output voltage Fu with the output voltage Vnout (i.e. Fu/Vnout cross point) and the cross point P2 of the output voltage Fu with the midpoint voltage Vn (i.e. Fu/Vn cross point). If the amplitude of the output voltage VnOUT increases the angle difference $\Delta\theta$ will increase because the Fu/VnOUT cross point P1 will shift to the left, as FIG. 7 is viewed, and, conversely, if the amplitude of VnOUT decreases $\Delta\theta$ will also decrease because the Fu/VnOUT cross point P2 will shift to the right. As the angle difference $\Delta\theta$ increases, the rise times of the corresponding comparator output voltage Cu will advance, and then the turn-on timings of the corresponding switching elements will also advance. The same can be said with regard to the filter output voltages Fv and Fw, the comparator output voltages Cv and Cw, and the turn-on timings of the corresponding switching elements. Therefore, by regulating the amplitude of the basic reference voltage Vref according to the rotational speed of the rotor 13, adjusted and optimum "ON" timings of the commutation circuit 15 can be obtained. Thus, not only any unwanted rotor trip-off problem can be prevented but also the motor can reliably be operated within a wide speed range. And this beneficial feature will help widen the applications of the motor.

Figure 8:
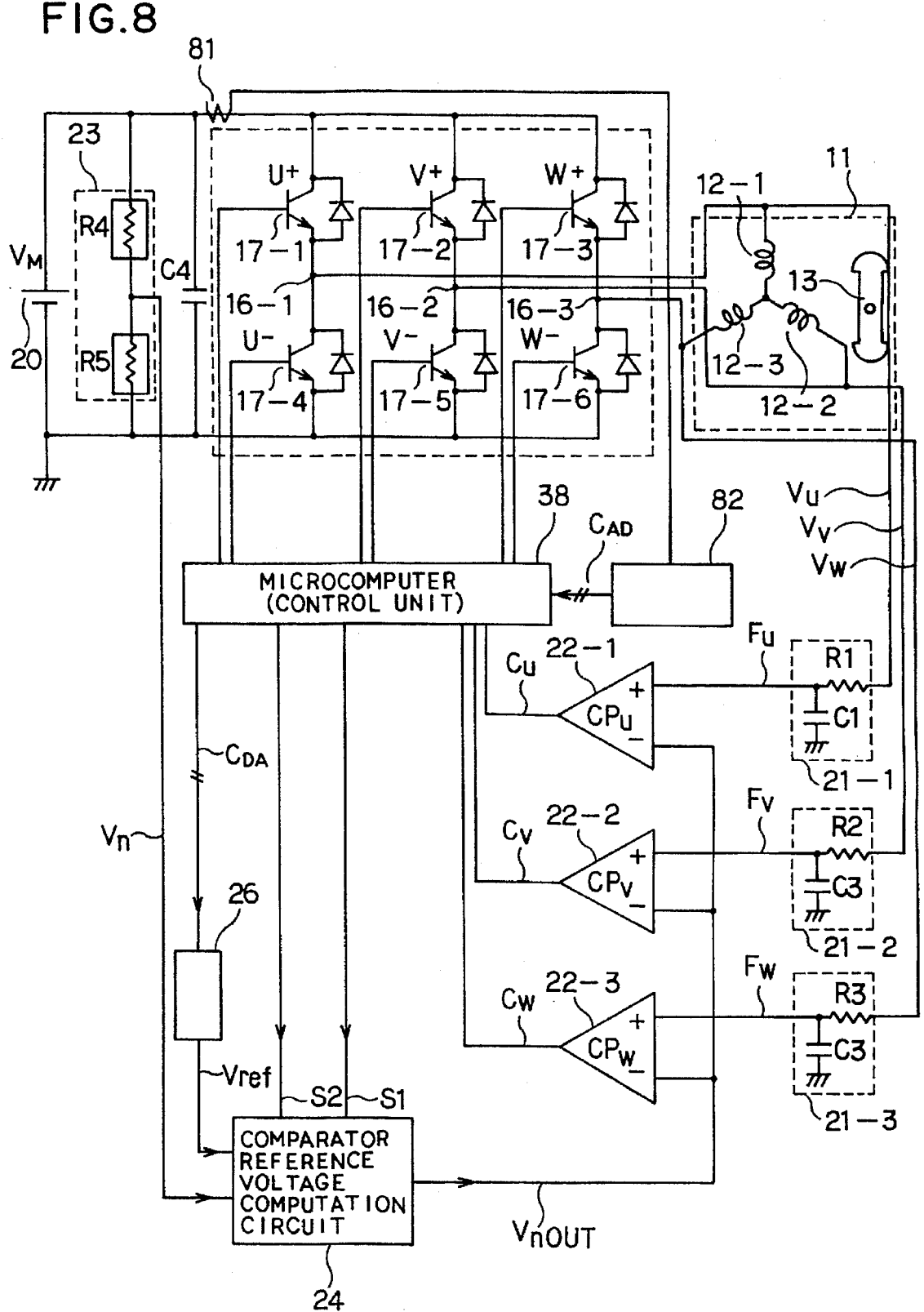
FIG. 8 is a circuit diagram of a brushless dc motor unit according to the third embodiment of the present invention.

FIG. 8 is a circuit diagram of a brushless dc motor according to the third embodiment of the present invention. Most components and functions for the third embodiment are identical to those for the first embodiment shown in FIG. 1. Like reference characters in FIGS. 8, and 1 denote like components having like functions. Therefore, only the components and the functions of the third embodiment that are different from those of the first embodiment will be described hereunder. Referring to FIG. 8, a current meter 81 is installed in the power supply line on the positive side of the dc power supply 20. The current meter 81 measures the current in the line and outputs an analogue signal to an AD converter 82, where the amount of measured current is converted to a digital signal CAD, WhiCh is transmitted to a microcomputer (or, a control unit) 38. Thus, the microcomputer 38 monitors the summed amount of the currents supplied from the dc power supply 20 to the armature windings 12-1, 12-2 and 12-3 by way of the commutation circuit 15. Then, when the amount of the currents monitored by the microcomputer 38 exceeds a predetermined upper value, the microcomputer 38 transmits a control signal CDA to the DA converter 26 to decrease the value of the basic reference voltage Vref. Conversely, when the amount of the currents is less than a predetermined lower value, the microcomputer 38 transmits a control signal CDA to the DA converter 26 to increase the value of the basic reference voltage Vref.

Figure 10:
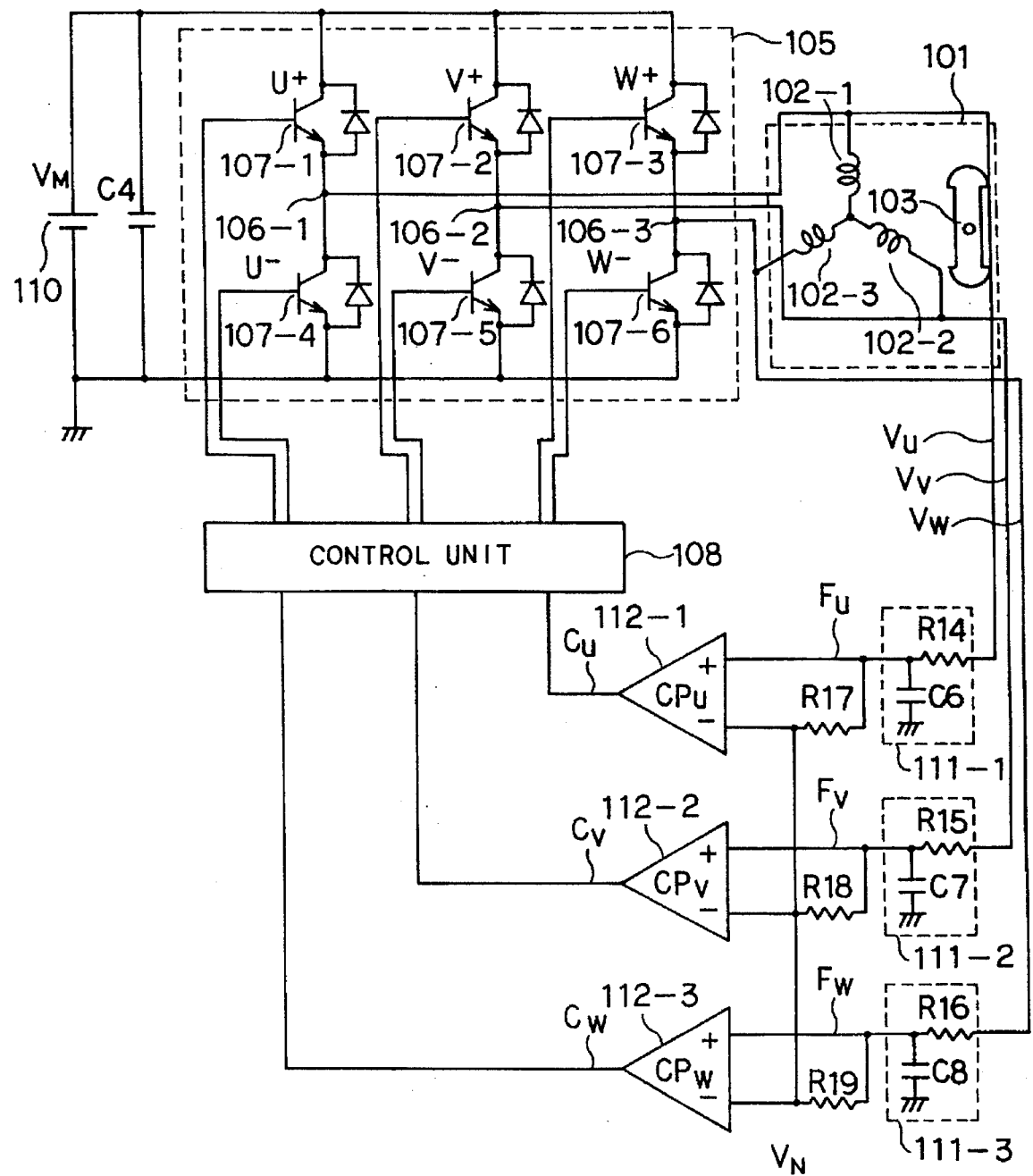
FIG. 10 is a circuit diagram of a conventional brushless dc motor unit.
Figure 11:
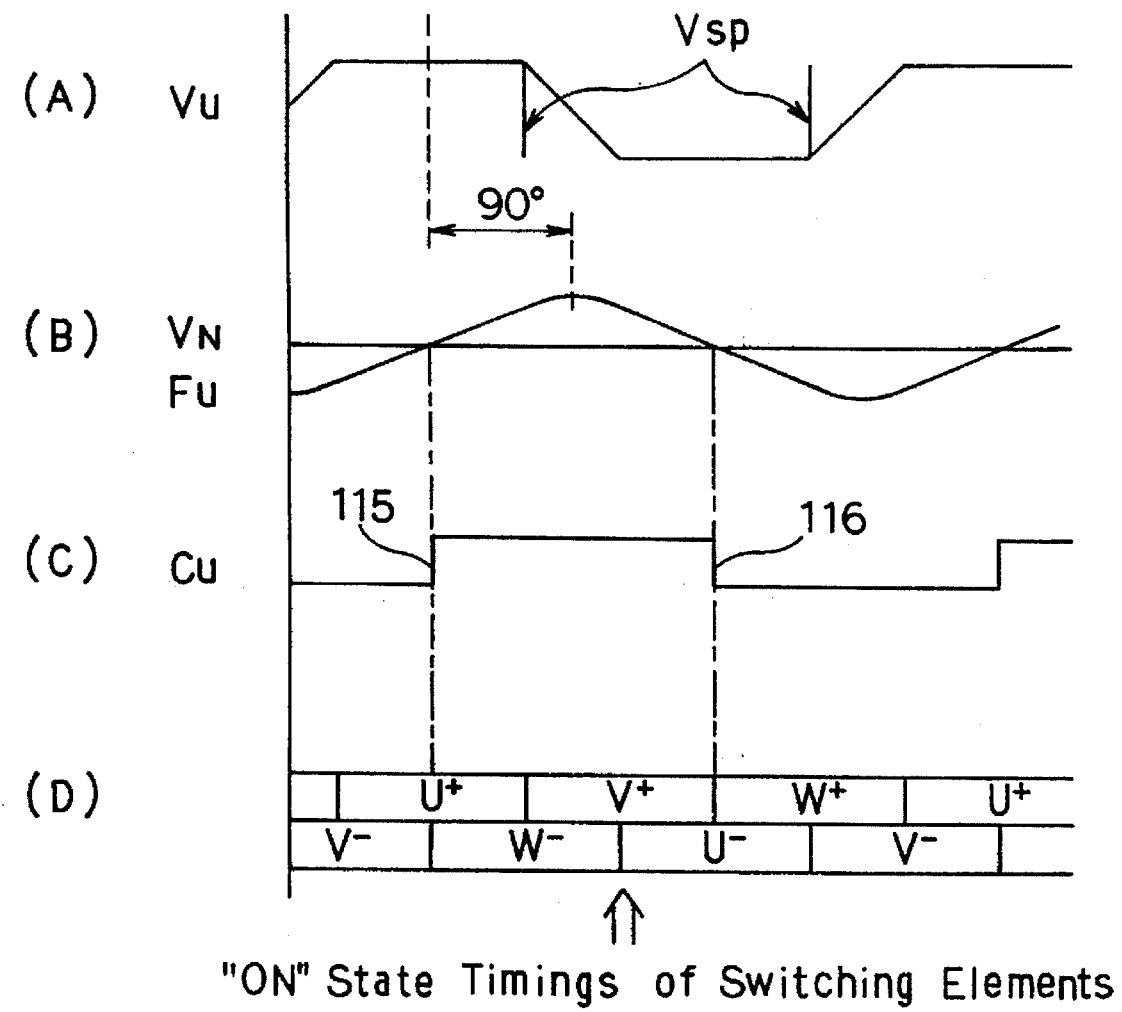
FIG. 11 shows voltage waveforms at various points of the circuitry shown in FIG. 10 representing a control function of the conventional motor unit.

Whereas, in a conventional brushless dc motor as shown in FIG. 10, when the motor drive currents increase, the turn-on timings of the solid-state commutation circuit 105 advance for the reason mentioned below. This phenomenon makes it difficult to maintain an efficient operation of the motor, and that may further lead to a rotor trip-off problem. In this category of brushless dc motors, spikes appear in the terminal voltages of armature windings, as exemplified by spike voltage Vsp of the armature terminal voltage Vu shown in FIG. 4(B) or FIG. 11(A). The pulse widths of such spikes increase as the motor drive currents increase. Such increased spike pulse widths cause to minimize the amount of delay of the outputs of the phase delay filter circuits. The third embodiment of the present invention, as shown in FIG. 5, provides a solution to such a problem by means of adjusting the value of the basic reference voltage Vref according to the amount of the motor drive currents. In other words, in the third embodiment, optimum turn-on timings can be obtained regardless of the variation of the motor drive currents, and the motor can, therefore, be operated with maximum efficiency all the time.

Figure 9:
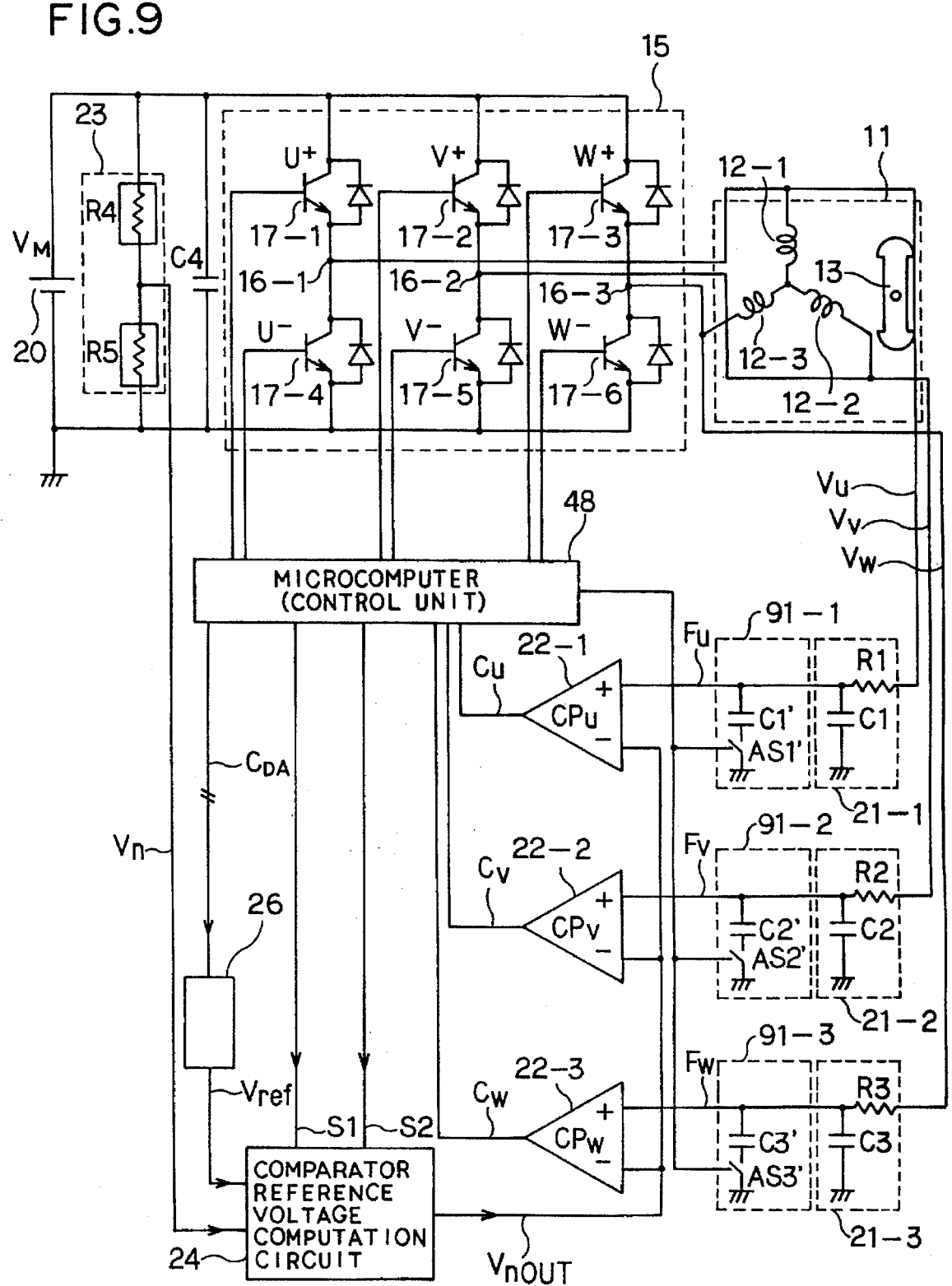
FIG. 9 is a circuit diagram of a brushless dc motor unit according to the fourth embodiment of the present invention.

FIG. 9 is a circuit diagram of a brushless dc motor according to the fourth embodiment of the present invention. This embodiment is a further improvement of the second embodiment shown in FIG. 5. FIG. 9 is similar to FIG. 5 and like reference characters denote like components having like functions. Therefore, only the components and functions in FIG. 9 that are different from those of FIG. 5 will be explained below. FIG. 9 of the fourth embodiment includes time constant increase circuits 91-1, 91-2 and 91-3 that are additionally connected between the output terminals of the phase delay filter circuits 21-1, 21-2 and 21-3, respectively, and the positive input terminals of the comparators 22-1, 22-2 and 22-3, respectively. The time constant increase circuits 91-1, 91-2 and 91-3 include capacitors C1', C2' and C3', respectively, which are connected in parallel with the capacitors C1, C2 and C3, respectively, and analog on-off switches AS1', AS2' and AS3', respectively, that are serially connected to the capacitors C1', C2' and C3', respectively. A microcomputer (i.e. control unit) 48 can transmit a common switch control signal to all of the on-off switches AS1', AS2' and AS3' simultaneously so as to turn on or off the switches, thereby abling or disabling the capacitors C1', C2' and C3'.

In the fourth embodiment shown in FIG. 9, as in the case of the second embodiment shown in FIG. 5, the phase delay angle of the phase delay filter circuits is less than 90°, i.e. approximately 60°. Therefore, as explained above in reference to FIG. 6, when the rotor speed decreases (i.e. the frequency decreases) the delay angle of the phase delay circuits 21-1, 21-2 and 21-3 becomes smaller, thereby decreasing the phase delay angle of the voltages having passed the phase delay filter circuits 21-1, 21-2 and 21-3. Such decrease of the phase delay angle can be compensated by decreasing the value of the basic reference voltage Vref as long as the rotor speed is within a normal range. However, when the rotor speed is low, such as less than 1,000 rpm, even if the basic reference voltage Vref is made zero, there is a possibility that no proper compensation to phase delay can be made, and the rotor may consequently trip off.

In view of such a problem, in the fourth embodiment, the microcomputer 48 monitors the rotor speed from the frequency of the voltage Cu, Cv, or Cw, and when the monitored rotor speed becomes smaller than a predetermined value, the microcomputer 48 transmits a signal to cause the analogue switches AS1', AS2', and AS3' to be closed, thereby abling the time constant increase circuits 91-1, 91-2 and 91-3. Then, the time constant and the amount of phase delay of the circuits 21-1, 21-2 and 21-3 combined with the circuits 91-1, 91-2 and 91-3, respectively, are increased, so that the possible rotor trip-off at a low speed can be prevented. In this fourth embodiment, therefore, the motor will be driven with a good stability even within a low speed range and failure in starting or loss of torque in connection with a low speed operation can be prevented.

It will be understood from the above that the brushless dc motor units according to the present invention have a good response characteristics to a sudden load variation, good starting and transient characteristics due to a stable rotor position detection even within a low speed range, and, yet, the motor control is not susceptible to electrical noises.

It should also be understood that various changes and modifications may be made in the above described embodiments which provide the characteristics of the present invention without departing from the spirit and principle thereof particularly as defined in the following claims.

What is claimed is:

1. A brushless dc motor and a control device therefor, the motor having 3-phase armature windings and a permanent-magnet rotor that is rotated by a rotating magnetic flux generated by the armature windings when energized, the control device comprising:

(a) a dc power supply, with a negative terminal grounded, having a motor drive voltage;

(b) a voltage divider for dividing said motor driving voltage to obtain a midpoint voltage that is one half thereof;

(c) an electronic commutation circuit connected to said dc power supply, said electronic commutation circuit having a plurality of solid-state switching elements, connected in a 3-phase bridge circuit, each having a switching control terminal, for commutating said motor drive voltage and providing 3-phase voltages individually provided to said 3-phase armature windings so that said windings are energized;

(d) a plurality of phase delay circuits for individually delaying, by an electric angle of less than 90°, phases of 3-phase back emf voltages generated in said 3-phase armature windings when said motor is in rotation;

(e) a plurality of voltage comparators each having a first input terminal and a second input terminal, said first input terminals being individually connected to output terminals of said phase delay circuits;

(f) a comparator reference voltage computation circuit for outputting a sawtooth-wave comparator reference voltage having a frequency proportional to a current angular speed of said rotor and an amplitude whose center voltage is equal to said midpoint voltage, said comparator reference voltage being commonly provided to said second input terminals of said voltage comparators, said comparator reference voltage computation circuit including:

a first operation amplifier having a positive and negative input terminals, to which a basic reference voltage is alternately provided at an alternating frequency proportional to the current angular speed of said rotor so as to output a first rectangular-wave voltage having an amplitude of two times said basic reference voltage with a center voltage thereof grounded, a second operation amplifier for receiving said first rectangular-wave voltage and said midpoint voltage to a common input terminal thereof and outputting a second rectangular-wave voltage having an amplitude equal to the amplitude of said first rectangular-wave voltage but a center voltage thereof being said midpoint voltage, and a low-pass filter circuit for converting said second rectangular-wave voltage to said sawtooth-wave comparator reference voltage; and (g) a switching control device for receiving comparator output voltages individually from said voltage comparators and generating switching control signals in reference individually to said comparator output voltages so that said switching control signals are individually provided to said switching control terminals of said switching elements so as to control said commutation circuit.

2. A brushless dc motor and a control device therefor according to claim 1, the control device further comprising:

(h) means for detecting a rotational speed of said rotor; and (i) means for increasing or decreasing the amplitude of said sawtooth-wave comparator reference voltage according to an increase or a decrease, respectively, of said rotor speed.

3. A brushless dc motor and a control device therefor according to claim 1, the control device further comprising:

(h) means for detecting a rotational speed of said rotor; and (i) means for setting said basic reference voltage in a manner that said basic reference voltage is increased or decreased when the rotor speed is increased or decreased, respectively, so as to change the amplitude of said sawtooth-wave comparator reference voltage according to the variation of said rotor speed.

4. A brushless dc motor and a control device therefor according to claim 3, wherein the detection of the rotor speed and the setting of said reference voltage are performed by said switching control device.

5. A brushless dc motor and a control device therefor according to claim 1, the control device further comprising:

(h) means for measuring an amount of total current supplied from said dc power supply to said armature windings by way of said commutation circuit; and (i) means for increasing or decreasing the amplitude of said sawtooth-wave comparator reference voltage according to an increase or a decrease, respectively, of the measured amount of current.

6. A brushless dc motor and a control device therefor according to claim 1, the control device further comprising:

(h) means for measuring an amount of total current supplied from said dc power supply to said armature windings by way of said commutation circuit; and (i) means for detecting an increase or a decrease of the monitored amount of total current; and (j) means for increasing or decreasing said basic reference voltage according to the increase or the decrease, respectively, of the measured amount of current.

7. A brushless dc motor and a control device therefor according to claim 6, wherein said means for detecting an increase or a decrease of the monitored amount of total current and said means for increasing or decreasing said basic reference voltage are performed by said switching control device.

8. A brushless dc motor and a control device therefor according to claim 1, the control device further comprising:
(h) means for detecting a rotational speed of said rotor; and
(i) means for increasing the time constant of each of said phase delay circuits when the detected rotor speed is below a predetermined speed.

9. A brushless dc motor and a control device therefor according to claim 8, wherein each of said phase delay circuits has a resistor connected in series and a first capacitor connected in parallel, and said means for increasing the time constant of each of said phase delay circuits includes:

a second capacitor connected in parallel to each of said first capacitor, and an on-off switch connected in series to each of said second capacitor so that said second capacitors are enabled when all of said on-off switches are simultaneously closed so as to increase the time constant of said phase delay circuits when the rotor speed is below the predetermined speed.

* * * * *